United States Patent
Kolb et al.

[11] Patent Number: 5,980,697
[45] Date of Patent: Nov. 9, 1999

[54] COMPONENT SEPARATION SYSTEM INCLUDING CONDENSING MECHANISM

[75] Inventors: William Blake Kolb; Gary L. Huelsman, both of St. Paul, Minn.

[73] Assignee: 3M Innovative Properties Company, St. Paul, Minn.

[21] Appl. No.: 08/824,216

[22] Filed: Mar. 25, 1997

Related U.S. Application Data

[63] Continuation of application No. 08/529,309, Sep. 18, 1995, abandoned.

[51] Int. Cl.$^6$ .............................. B01D 3/42; B01D 5/00
[52] U.S. Cl. .............................. 203/1; 159/906; 165/913; 203/100
[58] Field of Search .............................. 203/10, 99, 100, 203/87, 86, 1, 39; 202/202, 185.1; 159/906, 32, 44, DIG. 23; 165/913

[56] References Cited

U.S. PATENT DOCUMENTS

| | | | |
|---|---|---|---|
| 3,568,766 | 3/1971 | Thomas | 202/236 |
| 3,846,251 | 11/1974 | Hay | 202/234 |
| 3,977,364 | 8/1976 | Gijsbers et al. | 159/906 |
| 3,989,104 | 11/1976 | Newton | 165/111 |
| 4,019,571 | 4/1977 | Kosson et al. | 165/105 |
| 4,180,129 | 12/1979 | Sumitomo | 165/110 |
| 4,235,679 | 11/1980 | Swaidan | 202/234 |
| 4,321,757 | 3/1982 | van der Blom . | |
| 4,365,423 | 12/1982 | Arter et al. . | |
| 4,413,425 | 11/1983 | Candor . | |
| 4,617,093 | 10/1986 | Hwang | 159/906 |
| 4,846,263 | 7/1989 | Miyazaki et al. | 122/366 |
| 4,894,927 | 1/1990 | Ogawa et al. . | |
| 4,911,233 | 3/1990 | Chao et al. | 165/111 |
| 4,966,655 | 10/1990 | Wilkerson, Jr. | 202/234 |
| 4,999,927 | 3/1991 | Durst et al. . | |
| 5,470,431 | 11/1995 | Okuda et al. | 159/28.6 |
| 5,581,905 | 12/1996 | Huelsman et al. | 34/421 |

FOREIGN PATENT DOCUMENTS

| | | | |
|---|---|---|---|
| 0 621 691 | 8/1994 | European Pat. Off. . | |
| 3501396 | 7/1986 | Germany | 203/10 |
| 40 09 797 A1 | 10/1991 | Germany . | |
| 1 401 041 | 7/1975 | United Kingdom . | |
| 2099713 | 12/1982 | United Kingdom | 159/28.6 |
| 0048509 | 9/1985 | WIPO | 203/10 |

OTHER PUBLICATIONS

Rogets' International Thesaurus, $3^{rd}$ ed. New York, 1834 pp. 262.4–264.13.

Lopez de Ramos, A. L., "Capillary Enhanced Diffusion of $CO_2$ in Porous Media," Ph.D. Thesis, University of Tulsa (1993).

*Primary Examiner*—Virginia Manoharan
*Attorney, Agent, or Firm*—Charles D. Levine

[57] ABSTRACT

A method and apparatus for separating components from a mixture includes a condensing surface located in a high vapor concentration region above the source of evaporated liquid. The evaporated liquid is condensed on the condensing surface. The condensed liquid is removed from the condensing surface while it remains liquid, using substantially capillary forces. A plurality of open grooves are formed on the condensing surface. The grooves channel the condensed liquid on the condensing surface away from the mixture. The grooves can be capillary grooves which satisfy the Concus-Finn Inequality.

18 Claims, 1 Drawing Sheet

U.S. Patent
Nov. 9, 1999
5,980,697

COMPONENT SEPARATION SYSTEM INCLUDING CONDENSING MECHANISM

This is a continuation of application Ser. No. 08/529,309 filed Sep. 18, 1995 abandoned.

TECHNICAL FIELD

The present invention relates to a system for separating components. More particularly, the present invention relates to removing liquid from a condensing surface used for separating components.

BACKGROUND OF THE INVENTION

Condensation is a common separation mechanism for many industrial processes. It is typically used with a heat transfer surface that is controlled at a temperature that will remove specific vapors from a gas stream. When vapors condense on these surfaces they form a combination of a liquid film, rivulets, or droplets that drain by gravity to the lowest point of the surface and then typically fall from the surface in droplet form. In most cases the heat transfer surface must be remote from the original high concentration source of the vapor to prevent the droplets from being reintroduced to the process. Locating the surface at a distance from the original source generally requires that the condensing operation occurs at a lower vapor concentration. This leads to inefficiencies that require colder operating temperatures, more surface area, or reduced rates of condensation.

In some processes, active systems remove the condensed liquid from the surface. For example a rotating surface with a scraping blade to remove the condensed liquid film. These systems can be located close to the process since the liquid is removed by mechanical means and will not be reintroduced to the process. However, these systems are complex, expensive, and have limited design flexibility to fit a particular process.

One example of a component separation system are the conventional dryers of coated substrates which direct large volumes of gas to the coated surface to evaporate the liquid and remove it in vapor form. In many cases, due to environmental or economic reasons, the vapors in the gas stream must be removed before exhausting to the atmosphere. Condensation is a common method of removing these vapors from the gas stream.

Systems using condensation typically are large heat exchangers or chilled rolls with wiping blades. They are located away from the web in-the bulk gas flow stream. Typically a heat exchanger is placed in the bulk gas flow stream and the surface temperature is reduced to a point where the vapors condense, removing them from the process.

The vapor concentration in the bulk gas flow stream must be kept below flammable limits, typically 1–2% of the gas stream. To obtain acceptable recovery efficiencies with low vapor concentration, the heat transfer surface must be large and the operating temperatures must be very low, on the order of −30° C. −0° C. This is very expensive and there are numerous process problems such as ice formation on the heat transfer surfaces. Significant effort has been expended in raising the vapor concentration to improve the efficiency of this process. An example is the use of inert gas as the gas flow stream which allows the vapor concentration to be increased, because the flammability limit is removed. However, these methods are also very expensive and create additional process problems that have limited their use in the industry. The vapor concentration at the surface of the coating, or gas/liquid interface, is very high and it drops off rapidly within several centimeters of the surface.

It would be ideal for maximum recovery efficiency to locate the heat transfer surface within several centimeters of the gas/liquid interface. Condensing surfaces generally cannot be located this close to the surface as the condensed liquid would drain by gravity back onto the coating surface. Active systems such as a rotating roll with a scraping blade could be close to the process but their shape does not fit the flat surface characteristic of the moving substrate and they are relatively complicated and expensive. There is a need for a system of removing the liquid from condensing surfaces in a component separation system.

SUMMARY OF THE INVENTION

The invention is a method and apparatus for separating components from a mixture. A source of evaporated liquid is provided and a condensing surface is located in a high vapor concentration region above the source of evaporated liquid. The evaporated liquid is condensed on the condensing surface, and the condensed liquid is removed from the condensing surface while the condensed liquid remains in the liquid state. This removal uses substantially only capillary forces.

The method and apparatus can also include evaporating liquid from the mixture, and recovering and collecting any liquid removed from the mixture.

The condensing mechanism used for this component separation system includes the condensing surface which receives evaporated liquid from the mixture, and a plurality of open grooves formed on the condensing surface. The grooves channel the condensed liquid on the condensing surface away from the mixture. The condensing surface can have a length of less than 2 m.

The grooves can be capillary grooves which satisfy the Concus-Finn Inequality, and can be parallel to each other. The condensing surface shape can be selected to correspond to the physical contour required by the component separation process.

An edge plate can be used to contact the condensing surface and facilitate removal of the condensed liquid from the condensing surface.

The condensing apparatus can be a condensing plate and can include passageways for receiving a heat transfer fluid.

DETAILED DESCRIPTION

This invention is a method and apparatus which can be used for various procedures including component separation. For example, drying a coating with solvent recovery is one operation that can be performed by the system. Distillation and liquid separation are other operations. The system is used to separate components from a gas mixture but can be used to separate liquid components from gas or non-gas mixtures by first converting the liquid to gas or vapor form. The method and apparatus can remove liquid from a condensing surface using capillary surfaces to control and direct the liquid that forms on the condensing surface.

This system eliminates the disadvantages of known condensation component separation methods. It uses simple, passive, capillary surfaces to remove liquid from a condensing surface to prevent reintroducing the liquid to the process. The capillary surfaces can be designed to fit any physical contour which provides flexibility to design for whatever physical shape the process requires. This allows the heat transfer surface to be located close to a high concentration process source of vapor for maximum efficiency. This permits providing a passive, flexible, inexpensive way to improve the condensation rates in processes for a given surface area and temperature differential.

Figure 1:
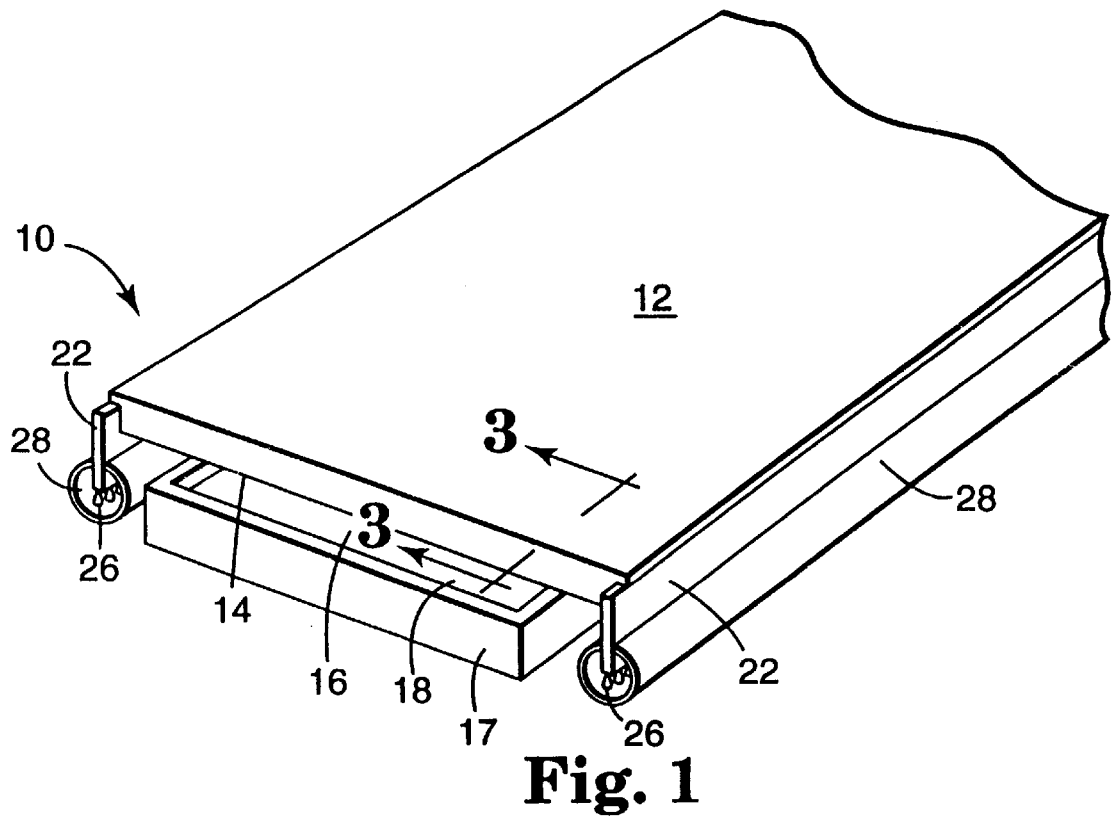
FIG. 1 is a perspective view of the apparatus of the invention.
Figure 2:
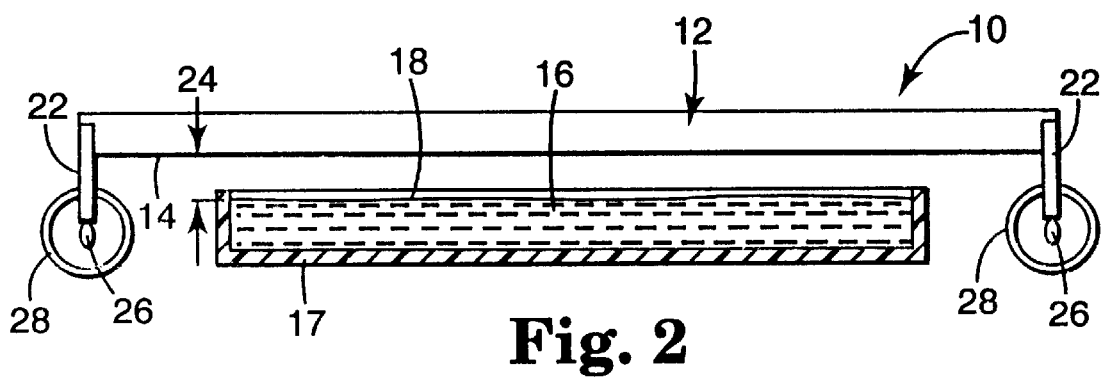
FIG. 2 is a front view, partially in crosssection of the apparatus of FIG. 1.
Figure 3:
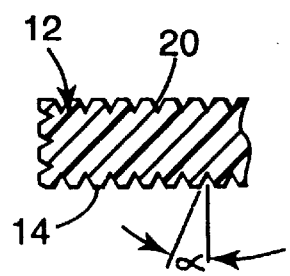
FIG. 3 is a partial cutaway view of the plate of the apparatus of FIG. 1.

Any kind of condensing structure can be used, such as plates of any type, whether flat or not, fins, tubes, or other structures. Plates, as described in this application, include fixed or moving platens and similar devices. FIGS. 1–3 show an apparatus using one platen. The platen has a condensing and liquid-removal surface located close to a vapor source of a mixture to be separated.

The apparatus operates on various mixtures. These mixtures can be a substrate with liquid coating, a fluid bath having a mixture of components, or any other combination of components from which a liquid or gaseous component can be separated.

As shown in FIGS. 1 and 2, the apparatus 10 includes a condensing platen 12 which has a condensing surface 14. As shown, the system is an open system. It is open to the environment. The condensing surface may be placed at any distance from the mixture 16, shown in container 17, which serves as a process vapor source and which has an evaporating surface 18—a surface from which liquid evaporates to separate that liquid from the other components in the mixture. This distance can be selected to control the rate of component separation. Vapors from the mixture 16 travel to the condensing surface 14 where they condense. The condensing surface can be located in a region of higher vapor concentration, such as within 1 m of the evaporating surface.

The condensing platen 12, which can be stationary or moving, is placed above but near the mixture 16. The condensing platen 12 can be at any orientation. The condensing platen 12 can be above the mixture 16, below the mixture, and the system can operate with the platen vertical or at any other angle, as long as the mixture permits such an orientation.

The illustrated condensing surface 14 is located above an evaporating surface 18 that is flat. The condensing surface 14, however, can be of any shape and can be designed to fit the process as required. The condensing surface 14 may be placed at any distance from the mixture 16. Vapors from the mixture 16 travel to the condensing surface 14 where they condense.

As shown, the condensing surface 14, which serves as a capillary surface, is flat, but it is not smooth. It has open capillary channels or grooves 20 which are designed to deliver the condensed liquid laterally to both edges of the platens 12. Edge plates 22 are located on both sides of the condensing surface 14, as shown in FIG. 1. These edge plates 22 are shown as perpendicular to the condensing surface 14, although they can be at other angles with it. The edge plates 22 can be smooth, capillary surfaces, porous media, or other surfaces.

Liquid from the mixture 16 is evaporated using any type of heat source, such as a heater placed on the side of the mixture opposite the condensing platen 12. The evaporated liquid from the mixture 16 travels across the gap 24 between its evaporating surface 18 and the condensing platen 12 and condenses on the condensing surface 14 of the condensing platen 12. The liquid condenses on the condensing surface 14. It resides on the outer surface of the condensing platen 12. It does not go into the condensing platen 12 and does not impregnate into the platen or its condensing surface 14. The grooves 20 on the condensing surface 14 use capillary forces to move the condensed liquid to edge plates 22. Alternatively, other capillary mechanisms can be used to remove the condensed liquid from the surface 14 of the condensing platen 12 to prevent the condensed liquid from returning to the mixture 16. Also, the condensed liquid need not be removed from the platen at all, as long as it is removed from the condensing surface 14 to prevent it from returning to the mixture 16.

When the liquid reaches the end of the grooves 20 it intersects with another capillary surface formed at the angle between the edge plates 22 and the grooves 20. The liquid collects at this interface and gravity overcomes the capillary force and the liquid flows as films or droplets 26 down the face of the edge plates 22. The droplets 26 fall from each edge plate 22 and can be collected in a collecting device, which can be located outside of the enclosure or within the enclosure as long as they prevent separated liquid from returning to the mixture. For example, a slotted pipe 28 can be placed around the bottom edge of each edge plate 22 to collect the liquid and direct it to a container.

The condensing platen 12 can include internal passageways, such as channels. A heat transfer fluid can be cooled or heated by an external device and circulated through the passageways in the condensing platen 12.

There is no limitation in the platen width other than the effective transporting rate of the capillary grooves 20. The capillary grooves 20 can be designed as capillary surfaces. A capillary surface is defined as a geometrically specific surface which satisfies the Concus-Finn Inequality which is: $\alpha+\theta_s<90°$, where $\alpha$ is half the included angle of any corner and $\theta_s$ is the gas/liquid/solid static contact angle. The static contact angle is governed by the surface tension of the liquid for a given surface material in gas. Capillary surfaces are discussed in great detail in Lopez de Ramos, A. L., "Capillary Enhanced Diffusion of $CO_2$ in Porous Media," Ph.D. Thesis, University of Tulsa (1993).

Using capillary surfaces to remove the condensed liquid provides the ability to locate the condensing surface 14 close to the high vapor concentration source just above the evaporating surface 18. As the evaporated liquid condenses on the surface, rather than being reintroduced to the process by gravity, it can be passively removed from the process. The invention is an inexpensive method of achieving greater operating efficiencies that allow higher operating temperatures, small surface areas, and high rates of condensation.

We claim:

1. A method of separating components from a mixture that is open to the environment comprising:

supplying admixture to a location spaced within 1 m of a condensing surface without passing the mixture through the condensing surface, wherein the mixture and the condensing surface are open to the environment;

at the location spaced within 1 m from the condensing surface, separating at least one component from the mixture to create a vapor of that component at an evaporating surface of the source of vapor;

condensing the vapor an the condensing surface to create a condensate without any condensate impregnating the condensing surface; and removing, using substantially only capillary forces, the condensate from the condensing surface while the condensate remains in the liquid state.

2. The method of claim 1 wherein the removing the condensate step comprises recovering and collecting any liquid removed from the mixture.

3. The method of claim 1 which is a method of separating components from a mixture which includes a solid substrate.

4. The method of claim 1 wherein of the components of the mixture, only the condensate collects on the condensing surface.

5. The method of claim 1 further comprising the step of cooling substantially the entire condensing surface.

6. The method of claim 1 wherein the removing the condensate step comprises moving the condensate toward at least two sides of the condensing surface.

7. A method of separating components from a mixture that is open to the environment comprising:

supplying a mixture to a location spaced from a condensing surface without passing the mixture through the condensing surface, wherein the mixture and the condensing surface are open to the environment;

at the location spaced from the condensing surface, separating at least one component from the mixture to create a vapor of that component;

condensing the vapor on the condensing surface to create a condensate without any condensate impregnating the condensing surface;

removing, using substantially only capillary forces, the condensate from the condensing surface while the condensate remains in the liquid state; and spacing the condensing surface from the location of the mixture at a distance selected to control the rate of component separation.

8. The method of claim 7 wherein the removing the condensate step comprises recovering and collecting any liquid removed from the mixture.

9. The method of claim 7 which is a method of separating components from a mixture which includes a solid substrate.

10. The method of claim 7 wherein of the components of the mixture, only the condensate collects on the condensing surface.

11. The method of claim 7 further comprising the step of cooling substantially the entire condensing surface.

12. The method of claim 7 wherein the removing the condensate step comprises moving the condensate toward at least two sides of the condensing surface.

13. A method of separating components from a mixture that is open to the environment comprising:

supplying a mixture to a location spaced from a condensing surface without passing the mixture through the condensing surface, wherein the mixture and the condensing surface are open to the environment;

at the location spaced from the condensing surface, separating at least one component from the mixture to create a vapor of that component;

condensing the vapor on the condensing surface to create a condensate without any condensate impregnating the condensing surface;

removing, using substantially only capillary forces, the condensate from the condensing surface while the condensate remains in the liquid state; and creating relative motion between the mixture and the condensing surface.

14. The method of claim 13 wherein the removing the condensate step comprises recovering and collecting any liquid removed from the mixture.

15. The method of claim 13 which is a method of separating components from a mixture which includes a solid substrate.

16. The method of claim 13 wherein of the components of the mixture, only the condensate collects on the condensing surface.

17. The method of claim 13 further comprising the step of cooling substantially the entire condensing surface.

18. The method of claim 13 wherein the removing the condensate step comprises moving the condensate toward at least two sides of the condensing surface.

* * * * *

UNITED STATES PATENT AND TRADEMARK OFFICE
CERTIFICATE OF CORRECTION

PATENT NO.   : 5,980,697
DATED        : November 9, 1999
INVENTOR(S)  : Gary L. Huelsman and William B. Kolb It is certified that error appears in the above-identified patent and that said Letters Patent is hereby corrected as shown below:

Column 4, claim 1,
Line 59, "admixture" should read -- a mixture --.
Line 68, "at" should read -- on --.

Column 5, claim 1,
Line 1, "an" should read -- on --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*